United States Patent [19]

Ward

[11] Patent Number: 4,683,050
[45] Date of Patent: Jul. 28, 1987

[54] MILD HYDROCRACKING WITH A CATALYST CONTAINING AN INTERMEDIATE PORE MOLECULAR SIEVE

[75] Inventor: John W. Ward, Yorba Linda, Calif.

[73] Assignee: Union Oil Company of California, Los Angeles, Calif.

[21] Appl. No.: 768,487

[22] Filed: Aug. 22, 1985

Related U.S. Application Data

[60] Continuation-in-part of Ser. No. 711,452, Mar. 13, 1985, and a continuation-in-part of Ser. No. 715,510, Mar. 22, 1985, Pat. No. 4,600,493, each is a continuation-in-part of Ser. No. 531,924, Sep. 13, 1983, Pat. No. 4,517,074, which is a division of Ser. No. 84,761, Oct. 15, 1979, Pat. No. 4,419,271, and a continuation-in-part of Ser. No. 699,919, Feb. 8, 1985, Pat. No. 4,610,973, which is a continuation of Ser. No. 531,924, Sep. 13, 1983, Pat. No. 4,517,074, which is a division of Ser. No. 84,761, Oct. 15, 1979, Pat. No. 4,419,271.

[51] Int. Cl.4 .................... C10G 47/12; C10G 47/20
[52] U.S. Cl. .................................. 208/110; 208/111; 208/114; 502/66; 502/214; 502/242; 502/256; 502/258; 502/263
[58] Field of Search .............. 208/109, 110, 111, 112, 208/114

[56] References Cited

U.S. PATENT DOCUMENTS

| 3,194,754 | 7/1965 | Fahnestock | 208/120 |
|---|---|---|---|
| 3,542,670 | 11/1970 | Erickson et al. | 208/120 |
| 4,062,809 | 12/1977 | Ward . | |
| 4,310,440 | 1/1982 | Wilson et al. | 423/305 X |
| 4,337,176 | 6/1982 | Boersma et al. | 423/326 X |
| 4,394,251 | 7/1983 | Miller | 208/111 |
| 4,410,501 | 10/1983 | Taramasso et al. | 502/242 X |
| 4,419,271 | 12/1983 | Ward | 502/65 |
| 4,420,467 | 12/1983 | Whittam | 423/328 |
| 4,428,862 | 1/1984 | Ward et al. | 502/77 |
| 4,431,517 | 2/1984 | Nevitt et al. | 208/111 |
| 4,440,871 | 4/1984 | Lok et al. | 502/214 |
| 4,476,011 | 10/1984 | Tait et al. | 208/111 |
| 4,495,061 | 1/1985 | Mayer et al. | 208/89 |
| 4,495,303 | 1/1985 | Kuehl | 502/62 |
| 4,500,651 | 2/1985 | Lok et al. | 502/208 |
| 4,517,074 | 5/1985 | Ward | 208/111 |
| 4,600,498 | 7/1986 | Ward | 208/111 |

Primary Examiner—Olik Chaudhuri
Attorney, Agent, or Firm—Dean Sandford; Gregory F. Wirzbicki

[57] ABSTRACT

Mild hydrocracking is accomplished with a catalyst containing an intermediate pore molecular sieve, such as silicalite or a ZSM-5 type zeolite.

32 Claims, No Drawings

MILD HYDROCRACKING WITH A CATALYST CONTAINING AN INTERMEDIATE PORE MOLECULAR SIEVE

RELATED APPLICATIONS

This application is a continuation-in-part of U.S. patent application Ser. No. 711,452 filed Mar. 13, 1985 pending, and also a continuation-in-part of U.S. patent application Ser. No. 715,510 filed Mar. 22, 1985, now U.S. Pat. No. 4,600,498, both of which are a continuation-in-part of U.S. patent application Ser. No. 531,924, filed Sept. 13, 1983, now U.S. Pat. No. 4,517,074, which is a divisional application of U.S. patent application Ser. No. 84,761, filed Oct. 15, 1979, and now U.S. Pat. No. 4,419,271. This application is also a continuation-in-part of U.S. patent application Ser. No. 699,919 filed Feb. 8, 1985, now U.S. Pat. No. 4,610,973, which is a continuation of U.S. patent application Ser. No. 531,924, filed Sept. 13, 1983, now U.S. Pat. No. 4,517,074, which is a divisional application of U.S. patent application Ser. No. 84,761, filed Oct. 15, 1979, and now U.S. Pat. No. 4,419,271.

BACKGROUND OF THE INVENTION

The invention relates to a process for mild hydrocracking hydrocarbon oils. More particularly, the invention relates to a mild hydrocracking catalytic process for treating vacuum gas oils and residuum hydrocarbon feedstocks.

In the refining of hydrocarbon oils, it is often desirable to subject the hydrocarbon oil to catalytic hydroprocessing. One such process is hydrocracking, a process wherein, in the typical instance, a gas oil or residuum feedstock is passed with hydrogen through a bed of catalyst active for cracking relatively high molecular weight compounds to more desirable, relatively low molecular weight compounds of lower boiling point. In addition, because the catalyst has hydrogenation activity, the cracked products are saturated by hydrogenation while organosulfur and organonitrogen compounds in the feed are converted to hydrogen sulfide and ammonia, respectively, both of which are usually removed in gas-liquid separators. Thus, the advantage of hydrocracking lies in the conversion of a sulfur-containing and/or nitrogen-containing gas oil feed, boiling, for example, mostly above about 700° F., to a relatively sulfur and nitrogen-free product of boiling point below 700° F., such as gasoline, jet fuel, diesel fuel, and mixtures thereof.

Recently, attention has been directed to "mild hydrocracking." The cost of constructing a hydrocracking unit operating at high pressures is quite significant and poses a major economic obstacle to its use. Accordingly, interest has developed in converting existing hydroprocessing units, such as hydrotreating or hydrodesulfurization units, into hydrocracking units. It is realized, of course, that hydrotreating units and the like are not normally designed for optimum hydrocracking conditions, and specifically, for the high pressures usually employed in commercial hydrocracking, i.e., above 1,500 p.s.i.g. Nevertheless, there is still an advantage if even some hydrocracking can be achieved under the low pressure constraints of typical hydrotreating or hydrodesulfurization units, and the challenge to the art is to discover hydrocracking catalysts having sufficient activity and activity maintenance to be commercially useful under such mild hydrocracking conditions.

Therefore, an aim of the art is to provide a mild hydrocracking catalyst having a high activity, selectivity and stability. Activity may be determined by comparing the temperature at which various catalysts must be utilized under otherwise constant mild hydrocracking conditions with the same feedstock so as to produce a given percentage (usually between 10 and 50 volume percent) of products boiling at or below 700° F. The lower the temperature for a given catalyst, the more active such a catalyst is for mild hydrocracking. Alternatively, activity may be determined by comparing the percentages of products boiling at or below 700° F. when various catalysts are utilized under otherwise constant mild hydrocracking conditions with the same feedstock. The higher the percentage of 700° F.—minus product converted from the components in the feedstock boiling above 700° F. for a given catalyst, the more active such a catalyst is in relation to a catalyst yielding a lower percentage of 700° F.—minus product. Selectivity of a mild hydrocracking catalyst may be determined during the foregoing described activity test and is measured as that percentage fraction of the 700° F.—minus product boiling in the range of middle distillate or midbarrel products, i.e., 300° F.-700° F. Stability is a measure of how well a catalyst maintains its activity over an extended time period when treating a given hydrocarbon feedstock under the conditions of the activity test. Stability is generally measured in terms of the change in temperature required per day to maintain a 40 volume percent or other given conversion (usually less than 50 volume percent).

SUMMARY OF THE INVENTION

The invention provides a mild hydrocracking process using a catalyst containing at least one active hydrogenation metal component in combination with an intermediate pore molecular sieve. In one embodiment, a vacuum gas hydrocarbon oil is mildly hydrocracked, with concomitant desulfurization and denitrogenation, by contact with the intermediate pore molecular sieve catalyst under mild hydrocracking conditions correlated so as to convert about 10 to about 50 volume percent of the oil fraction boiling above 700° F. to hydrocarbon products boiling at or below about 700° F.

The most preferred intermediate pore molecular sieve for use in the invention is silicalite or a similarly active microporous crystalline silica. Second only to such materials in preference are ZSM-5-type zeolites.

One of the most important discoveries in the invention is that silicalite, ZSM-5, and related materials are useful under the relatively unfavorable conditions of mild hydrocracking. ZSM-5, of course, is well known for its activity in cracking straight chain and slightly branched chain paraffins, and a similar discovery pertaining to silicalite was disclosed in U.S. Pat. No. 4,428,862 issued to the present inventor and Timothy L. Carlson. However, since the pore sizes of these molecular sieves exclude large, ring-shaped organic compounds as well as heavily branched paraffins, they are generally considered unsuitable for hydrocracking under the favorable conditions of high pressure. Thus, it was a distinct surprise to discover in the present invention that these molecular sieves proved highly useful under the unfavorable low pressure conditions existing in mild hydrocracking.

DETAILED DESCRIPTION OF THE INVENTION

The invention is directed to a mild hydrocracking process using a catalyst comprising one or more active hydrogenation metals or compounds thereof and an intermediate pore molecular sieve having cracking activity and a pore size between about 5.0 and about 7.0 angstroms, preferably between about 5.0 and 6.0 angstroms. The term "molecular sieve" as used herein refers to any material capable of separating atoms or molecules based on their respective dimensions. The preferred molecular sieve is a crystalline material, and even more preferably, a crystalline material of relative uniform pore size. The term "pore size" as used herein refers to the diameter of the largest molecule that can be sorbed by the particular molecular sieve in question. The measurement of such diameters and pore sizes is discussed more fully in Chapter 8 of the book entitled "Zeolite Molecular Sieves" written by D. W. Breck and published by John Wiley & Sons in 1974, the disclosure of which book is hereby incorporated by reference in its entirety.

The intermediate pore crystalline molecular sieve which forms one of the components of the catalyst of the invention may be zeolitic or nonzeolitic, has a pore size between about 5.0 and about 7.0 angstroms, possesses cracking activity, and is normally comprised of 10-membered rings of oxygen atoms. The preferred intermediate pore molecular sieve selectively sorbs n-hexane over 2,2-dimethylbutane. The term "zeolitic" as used herein refers to molecular sieves whose frameworks are formed of substantially only silica and alumina tetrahedra, such as the framework present in ZSM-5 type zeolites. The term "nonzeolitic" as used herein refers to molecular sieves whose frameworks are not formed of substantially only silica and alumina tetrahedra. Examples of nonzeolitic crystalline molecular sieves which may be used as the intermediate pore molecular sieve include crystalline silicas, silicoaluminophosphates, chromosilicates, aluminophosphates, titanium aluminosilicates, titaniumaluminophosphates, ferrosilicates, and borosilicates, provided, of course, that the particular material chosen has a pore size between about 5.0 and about 7.0 angstroms.

The silicoaluminophosphates which may be used as the intermediate pore crystalline molecular sieve in the catalyst of the invention are nonzeolitic molecular sieves comprising a molecular framework of $[AlO_2]$, $[PO_2]$, and $[SiO_2]$ tetrahedral units. The different species of silicoaluminophosphate molecular sieves are referred to by the acronym SAPO-n, where "n" denotes a specific structure type as identified by X-ray powder diffraction. The various species of silicoaluminophosphates are described in detail in U.S. Pat. No. 4,440,871, the disclosure of which is hereby incorporated by reference in its entirety, and one use of these materials is disclosed in U.S. Pat. No. 4,512,875, herein incorporated by reference in its entirety. The silicoaluminophosphates have varying pore sizes and only those that have pore sizes between about 5.0 and 7.0 angstroms may be used as the intermediate pore molecular sieve in the catalyst of the invention. Thus, typical examples of silicoaluminophosphates suitable for use in the catalyst are SAPO-11 and SAPO-41. The silicoaluminophosphates are also discussed in the article entitled "Silicoaluminophosphate Molecular Sieves: Another New Class of Microporous Crystalline Inorganic Solids" published in the *Journal of American Chemical Society*, Vol. 106, pp. 6093–6095, 1984. This article is hereby incorporated by reference in its entirety.

Other nonzeolitic molecular sieves which can be used as the intermediate pore crystalline molecular sieve in the catalyst of the invention are the crystalline aluminophosphates. These molecular sieves have a framework structure whose chemical composition expressed in terms of mole ratios of oxides is $Al_2O_3 : 1.0 \pm 0.2\ P_2O_5$. The various species of aluminophosphates are designated by the acronym $AlPO_4$-n, where "n" denotes a specific structure type as identified by X-ray powder diffraction. The structure and preparation of the various species of aluminophosphates are discussed in U.S. Pat. Nos. 4,310,440 and 4,473,663, the disclosures of which are hereby incorporated by reference in their entireties. One useful crystalline aluminophosphate is $AlPO_4$-11.

Two other classes of intermediate pore molecular sieves for use in the invention are borosilicates and chromosilicates. Borosilicates are described in U.S. Pat. Nos. 4,254,297, 4,269,813, and 4,327,236, the disclosures of all three of which are hereby incorporated by reference in their entireties. Chromosilicates are described in detail in U.S. Pat. No. 4,405,502, the disclosure of which is also hereby incorporated by reference in its entirety.

Another class of intermediate molecular sieve for use in the invention are the titanium aluminophosphates. Such materials are described in greater detail in U.S. Pat. No. 4,500,651, herein incorporated by reference in its entirety, and are designated by the acronym TAPO-n where the "n" is an arbitrary number specific to a given member of the class. One such material which has a pore size of intermediate dimensions is TAPO-11.

Yet another class of molecular sieves herein are the titanium aluminosilicates, particularly those described under the acronym TASO-n where, again, the "n" is an arbitrary number specific to a given member of the class. One such material having a pore size of intermediate dimension is TASO-45.

The most useful zeolites for use in the invention are the crystalline aluminosilicate zeolites of the ZSM-5 type, such as ZSM-5, ZSM-11, ZSM-12, ZSM-23, ZSM-35, ZSM-38, and the like, with ZSM-5 being preferred. ZSM-5 is a known zeolite and is more fully described in U.S. Pat. No. 3,702,886 herein incorporated by reference in its entirety; ZSM-11 is a known zeolite and is more fully described in U.S. Pat. No. 3,709,979, herein incorporated by reference in its entirety; ZSM-12 is a known zeolite and is more fully described in U.S. Pat. No. 3,832,449, herein incorporated by reference in its entirety; ZSM-23 is a known zeolite and is more fully described in U.S. Pat. No. 4,076,842, herein incorporated by reference in its entirety; ZSM-35 is a known zeolite and is more fully described in U.S. Pat. No. 4,016,245, herein incorporated by reference in its entirety; and ZSM-38 is a known zeolite and is more fully described in U.S. Pat. No. 4,046,859, herein incorporated by reference in its entirety. These zeolites are known to readily adsorb benzene and normal paraffins, such as n-hexane, and also certain mono-branched paraffins, such as isopentane, but to have difficulty adsorbing di-branched paraffins, such as 2,2-dimethylbutane, and polyalkylaromatics, such as meta-xylene. These zeolites are also known to have a crystal density not less than 1.6 grams per cubic centimeter, a silica-to-alumina ratio of at least 12, and a constraint index, as defined in U.S. Pat. No. 4,229,282, incorporated by reference herein in its entirety, within the range of 1 to 12. The foregoing zeolites are also known to have an effective pore diameter greater than 5 angstroms and to have pores defined by 10-membered rings of oxygen atoms, as explained in U.S. Pat. No. 4,247,388, herein incorporated by reference in its entirety. Such zeolites are preferably utilized in the acid form, as by replacing at least some of the metals contained in the ion exchange sites of the zeolite with hydrogen ions. This exchange may be accomplished directly with an acid or indirectly by ion exchange with ammonium ions followed by calcination to convert the ammonium ions to hydrogen ions. In either case, it is preferred that the exchange be such that a substantial proportion of the ion exchange sites utilized in the catalyst support be occupied with hydrogen ions.

The most preferred intermediate pore crystalline molecular sieve that may be used as part of the catalyst of the invention is a crystalline silica molecular sieve essentially free of aluminum and other Group IIIA metals. (By "essentially free of Group IIIA metals" it is meant that the crystalline silica contains less than 0.75 percent by weight of such metals in total, as calculated as the trioxides thereof, e.g., $Al_2O_3$). The preferred crystalline silica molecular sieve is a silica polymorph, such as the material described in U.S. Pat. No. 4,073,685. One highly preferred silica polymorph is known as silicalite and may be prepared by methods described in U.S. Pat. No. 4,061,724, the disclosure of which is hereby incorporated by reference in its entirety. Silicalite does not share the zeolitic property of substantial ion exchange common to crystalline aluminosilicates and therefore contains essentially no zeolitic metal cations. Unlike the "ZSM family" of zeolites, silicalite is not an aluminosilicate and contains only trace proportions of alumina derived from reagent impurities. Some extremely pure silicalites (and other microporous crystalline silicas) contain less than about 100 ppmw of Group IIIA metals, and yet others less than 50 ppmw, calculated as the trioxides.

In the preferred embodiment of the invention, the crystalline molecular sieve is intimately admixed with a porous, inorganic, amorphous refractory oxide such as alumina, to produce a high surface area support upon which the hydrogenation metal component is subsequently deposited. The proportion of molecular sieve in the support typically varies in the range of 2 to 90 percent by weight, but preferably the support consists essentially of a heterogeneous dispersion of the molecular sieve in a matrix of alumina or other amorphous porous refractory oxide. Such a dispersion contains the molecular sieve in a minor proportion, usually between about 15 and 45 percent, and more usually between 20 and 40 percent, by weight, with 30 percent being most highly preferred.

The amorphous matrix portion of the support material is typically comprised of such amorphous inorganic refractory oxides as silica, magnesia, silica-magnesia, zirconia, silica-zirconia, titania, silica-titania, alumina, silica-alumina, etc. Mixtures of the foregoing oxides are also contemplated, especially when prepared as homogeneously as possible.

The most highly preferred amorphous refractory oxide for use in the catalyst of the invention is a dispersion of silica-alumina in a matrix containing, but more preferably consisting essentially of, alumina. Such dispersions are described in U.S. Pat. Nos. 4,097,365 and 4,419,271, both of which are herein incorporated by reference in their entireties. One convenient method for preparing the amorphous matrix portion of the support herein is to comull an alumina hydrogel with a silica-alumina cogel in hydrous or dry form. The cogel is preferably homogenous and may be prepared in a manner such as that described in U.S. Pat. No. 3,210,294. Alternatively, the alumina hydrogel may be comulled with a "graft copolymer" of silica and alumina that has been prepared, for example, by first impregnating a silica hydrogel with an alumina salt and then precipitating alumina gel in the pores of the silica hydrogel by contact with ammonium hydroxide. In the usual case, the cogel or copolymer (either of which usually comprises silica in a proportion by dry weight of 20 to 96 percent, preferably 50 to 90 percent) is mulled with the alumina hydrogel such that the cogel or copolymer comprises 5 to 75 weight percent, preferably 20 to 65 weight percent, of the mixture. The overall silica content of the resulting dispersion on a dry basis is usually between 1 and 75 weight percent, preferably between 10 and 60 weight percent.

The molecular sieve/amorphous matrix support material is usually prepared in the form of shaped particulates, with the preferred method being to extrude a precursor of the desired support through a die having openings therein of desired size and shape, after which the extruded matter is cut into extrudates of desired length. The support particles may also be prepared by mulling (or pulverizing) a precalcined amorphous refractory oxide to a particle size less than about 100 microns and then admixing therewith the desired molecular sieve. In the highly preferred embodiment in which the amorphous matrix portion of the support contains a dispersion of silica-alumina in a matrix containing alumina, a mulled mixture of alumina gel with either a silica-alumina cogel or a silica and alumina "graft copolymer" may be utilized in the gel form or may be dried and/or calcined prior to combination with the molecular sieve. In the preferred method of preparation, the cogel or copolymer is spray-dried and then crushed to a powdered form, following which the powder is mulled with the molecular sieve powder. The amounts of cogel or copolymer mulled with the halogenated catalytic component are such that the support will ultimately contain the molecular sieve and dispersion in the proportions set forth hereinbefore. If the amorphous matrix support is not capable of sufficiently binding with the molecular sieve, a suitable binder, such as peptized Catapal$^{TM}$ alumina, may be admixed with the molecular sieve and refractory oxide prior to extrusion.

The extruded particles may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about ⅛ inch, preferably about 1/32 to about 1/12 inch, and most preferably about 1/24 to about 1/15 inch. Among the preferred catalyst configurations are cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other preferred particulates are those having quadralobal cross-sectional shapes, as in FIG. 10 of U.S. Pat. No. 4,028,227.

Typical characteristics of the molecular sieve/amorphous matrix supports utilized herein are a total pore volume, average pore diameter and surface area large enough to provide substantial space and area to deposit the active metal components. The total pore volume of the support, as measured by conventional mercury porosimeter methods, is usually about 0.2 to about 2.0 cc/gram, preferably about 0.4 to about 1.5 cc/gram, and most preferably about 0.5 to about 0.9 cc/gram. Surface area is typically between about 250 and 600 m$^2$/gm, preferably between 350 and 480 m$^2$/gm.

To prepare the mild hydrocracking catalyst, the support material is compounded, as by impregnation of calcined molecular sieve/amorphous matrix support particles, with one or more precursors of at least one catalytically active hydrogenation metal component. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination, as for example at temperatures between 750° F. and 140° F., converts the metals to their respective oxide forms. In some cases, calcinations may follow each impregnation of individual active metals. Such multiple impregnation-calcination procedures, however, may be avoided in alternative embodiments of the invention, as for example, by comulling all the active metals with the support materials rather than impregnating the metals thereon. In comulling, precursors of the support materials, usually a mixture including the molecular sieve and the amorphous matrix in a hydrated or gel form, are admixed with precursors of the active metal components, either in solid form or in solution, to produce a paste suitable for shaping by known methods, e.g., pelleting, extrusion, etc. A subsequent calcination yields a mild hydrocracking catalyst containing the active metals in their respective oxide forms.

When the mild hydrocracking catalyst is prepared by the foregoing or equivalent methods, at least one active metal component having hydrogenation activity, typically one or more metal components from the Group VIB and VIII metals of the Periodic Table of Elements, is introduced into the catalyst. Preferably, the catalyst contains both a Group VIB and VIII element as hydrogenation metals, with cobalt or nickel and molybdenum or tungsten being the preferred combination of active metals, and nickel and tungsten being most preferred. The catalyst contains up to about 10, usually from 1 to 8 percent, and preferably from 2 to 6 percent by weight of the Group VIII metal, calculated as the monoxide, and up to about 30, usually from about 3 to about 28 percent, and preferably from 8 to 26 percent by weight of the Group VIB metal, calculated as the trioxide. A highly preferred catalyst useful herein contains about 5 to about 30 weight percent of Group VIB metal components, calculated as the trioxide, and from about 0.5 to about 8 weight percent of Group VIII metal components, calculated as the monoxide (Note: if molybdenum is selected as the active metal, it generally is solubilized with phosphoric acid during the preparation of the catalyst. Therefore, molybdenum-containing catalysts will usually further contain a phosphorus component on the catalyst, which phosphorus component may provide acid properties to the catalyst or act as a catalytic promoter.)

Catalysts are activated in accordance with methods suited to a mild hydrocracking process. Most of the catalysts used in the mild hydrocracking process of the invention are more active, sometimes even far more active, in a sulfided form than in the oxide form in which they are generally prepared. Accordingly, the catalyst used herein may be sulfided prior to use (in which case the procedure is termed "presulfiding"), for example, by passing a sulfiding agent over the catalyst prepared in the calcined form. Temperatures between 300° and 700° F. and gaseous space velocities between about 140 and 500 v/v/hr are generally employed, and this treatment is usually continued for at least about two hours. A mixture of hydrogen and one or more components selected from the group consisting of sulfur vapor and sulfur compounds (e.g., lower molecular weight thiols, organic sulfides, and especially $H_2S$) is suitable for presulfiding. Generally speaking, the relative proportion of hydrogen in the presulfiding mixture is not critical, with any proportion of hydrogen ranging between 1 and 99 percent by volume being adequate. Also, liquid sulfiding agents, such as dimethyl disulfide and the like, may be used for presulfiding.

If the catalyst is to be used in a sulfided form, it is preferred that a presulfiding procedure be employed. However, since mild hydrocracking can be employed to upgrade sulfur-containing hydrocarbons (i.e., hydrodesulfurization), one may, as an alternative, accomplish the sulfiding in situ with sulfur-containing hydrocarbon oils, particularly those containing about 1.0 weight percent or more of sulfur, under mild hydrocracking conditions.

The typical and preferred catalyst ultimately used for mild hydrocracking herein is essentially free of an acid halogen component, such as fluorine or chlorine. Preferably, the catalyst consists essentially of one or more active hydrogenation metals or compounds thereof, an intermediate pore molecular sieve, and a porous refractory oxide. The most preferred catalyst, as disclosed in U.S. Pat. No. 4,428,862, herein incorporated by reference in its entirety, consists essentially of a sulfided catalyst containing nickel and tungsten on a support of silicalite and a dispersion of silica-alumina in a gamma-alumina matrix, with a binder material being present if desired.

The mild hydrocracking catalyst may be employed as either a fixed, slurried or fluidized bed (but most usually a fixed bed) of particulates in a suitable reactor vessel wherein the hydrocarbon oil to be treated is introduced and subjected to mild hydrocracking conditions including an elevated total pressure, temperature, and hydrogen partial pressure. Under such conditions, the hydrocarbon oil and catalyst are subjected to a hydrogen partial pressure usually less than 1,500 p.s.i.g. (frequently less than about 1,200 p.s.i.g. for vacuum gas oil mild hydrocracking) at a space velocity usually less than 3.0 LHSV so as to effect the desired degree of hydrocracking, desulfurization, and denitrogenation.

As used herein, "mild hydrocracking" requires the conversion of about 10 to about 50 volume percent of the feedstock hydrocarbons boiling above about 700° F. to products boiling at or below 700° F. from a single pass of the feedstock. Preferably, mild hydrocracking conditions are such that at least a 15 volume percent conversion is obtained, and usually no more than a 35 volume percent conversion is obtained.

Contemplated for treatment by the process of the invention are relatively high boiling hydrocarbon-containing oils including crude petroleum oils and synthetic crudes. Among the typical oils contemplated are top crudes, vacuum and atmospheric residual fractions, light and heavy atmospheric and vacuum distillate oils, shale oils, and oils from bituminous sands, coal compositions and the like. For use herein, typical hydrocarbon oils, or mixtures thereof, contain at least about 50 volume percent of components normally boiling above about 700° F.

Generally, a substantial proportion (i.e., at least about 90 volume percent) of hydrocarbon feeds such as gas oils and the like boil at a temperature less than about 1100° F., preferably less than about 1050° F., and usually boil entirely within the range of about 100° F. to about 1100° F., and most frequently in the range from about 500° F. to about 1100° F.

Although virtually any high boiling hydrocarbon feedstock may be treated by mild hydrocracking, the process is particularly suited to treating (1) gas oils, preferably light and heavy vacuum gas oils and waxy shale oils, and (2) heavy residual fractions, especially the treated atmospheric and vacuum residuum oils containing less than about 25 ppmw of contaminant metals (vanadium, nickel, and the like). Sulfur is usually present in such oils in a proportion exceeding 0.1 weight percent and often exceeding 1.0 weight percent. Frequently, the feedstock contains undesirable proportions of nitrogen, usually in a concentration greater than about 0.01 weight percent and often between about 0.01 and 1.0 weight percent. The feedstock may contain waxy components, e.g., n-paraffins and isoparaffins, and thus have a high pour point, e.g., at least about 30° F.

A hydroprocessing reactor useful in the mild hydrocracking process of the invention is ordinarily an existing reactor that is part of an existing hydroprocessing unit, or units, in a refinery. A preferred reactor is one formerly used for vacuum gas oil desulfurization. In the mild hydrocracking of such a gas oil, the catalyst is usually maintained as a fixed bed with the feedstock passing downwardly once therethrough, and the reactor is generally operated under conditions within the limits of the existing reactor design. In some instances, mild hydrocracking reactors may be added to the existing equipment, either in series or parallel. If the feedstock is unusually high in organonitrogen and organosulfur compounds, it may be pretreated, integrally or separately, using a hydrotreating catalyst.

Typical mild hydrocracking conditions that yield more than about 10 volume percent conversion of the oil fraction boiling above 700° F. to liquid products boiling at or below 700° F. are shown in the following Table I:

TABLE I

| Operating Conditions | Suitable Range | Preferred Range |
|---|---|---|
| Temperature, °F. | 500–900 | 600–850 |
| Hydrogen Pressure, p.s.i.g. | 200–1,500 | 500–1,300 |
| Space Velocity, LHSV | 0.05–3.0 | 0.1–1.5 |
| Hydrogen Recycle Rate, scf/bbl | 500–15,000 | 1000–10,000 |

Generally, the hydrogen partial pressure maintained during hydrocracking is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

Another preferred reactor utilized in the process of the invention is a hydrodesulfurization reactor formerly used for processing a hydrocarbon residuum feedstock. Ordinarily, this reactor is in the latter stage, or stages, of a multi-stage unit for hydrodesulfurization and/or demetallization of a residuum-containing feedstock. In the case of mild hydrocracking a residuum feedstock, the hydrogen partial pressure is usually higher than that during mild hydrocracking a gas oil. In comparison to conventional hydrodesulfurization conditions that yield, from a single pass, less than about 10 volume percent of liquid hydrocarbon products boiling at or below 700° F., the operating conditions of the process of the invention for mild hydrocracking a residuum hydrocarbon typically include an increased temperature and/or decreased space velocity, correlated to effect a conversion greater than 10 percent.

The results obtained in any particular mild hydrocracking process will depend upon the nature of the catalyst, the nature of the feedstock, and the severity of the operating conditions. Also, it is highly preferred that about 15 to about 35 volume percent of the oil is converted, in a single pass, to liquid products boiling at or below 700° F., and that at least about 85 volume percent of the 700° F. minus fraction contain liquid hydrocarbon products boiling in the midbarrel range from about 300° F. to about 700° F.

The invention is further illustrated by the following examples which are illustrative of specific modes of practicing the invention and are not intended as limiting the scope of the invention defined by the appended claims.

EXAMPLE I

Two catalysts were prepared in accordance with the invention. The first catalyst, Catalyst A, was prepared by extruding a mixture of 30 weight percent silicalite, 50 weight percent gamma alumina, and 20 weight percent Catapal TM alumina binder through a die with 1/16-inch diameter openings. The extruded matter, having a cylindrical shape, was broken into particulates, dried at 930° F., and then impregnated with nickel nitrate (Ni(NO$_3$)$_2$.6H$_2$O) and ammonium metatungstate so as to incorporate into the catalyst, after drying and a calcination at 900° F., about 4 weight percent nickel components, calculated as NiO, and about 22 weight percent tungsten components, calculated as WO$_3$.

The second catalyst, Catalyst B, was prepared in the same manner as Catalyst A except that, instead of gamma alumina, a dispersion of silica-alumina in alumina was utilized. The dispersion was itself prepared by mixing about 60 parts by dry weight of a 75/25 silica-alumina graft copolymer with about 40 parts by weight of hydrous alumina gel. Overall, the dispersion consisted essentially of 48 percent by weight silica and 52 percent by weight of alumina.

Both catalysts were tested for their activity for mild hydrocracking the hydrocarbon feedstock identified in the following Table II.

TABLE II

| Feedstock Properties | |
|---|---|
| Feed Description | Light Arabian Vacuum Gas Oil |
| Gravity, °API | 22.3 |
| Sulfur, wt. % | 2.54 |
| Nitrogen, wt. % | 0.09 |
| Carbon Residue, D-189, wt. % | 0.42 |
| Pour Point, °F. | +95 |
| ASTM D-1160, Vol. % | Distillation, °F. |
| IBP/5 | 623/700 |
| 10/20 | 737/776 |
| 30/40 | 810/837 |
| 50/60 | 860/898 |
| 70/80 | 928/968 |
| 90/95 | 1019/1056 |
| EP | 1103 |

The test was conducted by contacting the catalysts in separate runs with the feedstock identified in Table II under mild hydrocracking conditions. However, at the outset of each run, the respective catalysts were presulfided by contact for about 16 to 20 hours with a gas consisting of 90 volume percent $H_2$ and 10 volume percent $H_2S$ flowing at 4.4 SCFM (one atmosphere pressure). The temperature during the presulfiding is initially at room temperature, is increased gradually until 700° F. is reached, and then lowered to 550° F., at which time the catalyst is contacted with the feedstock.

A portion of the feedstock is passed downwardly through a reactor vessel and contacted with the described catalysts in a single-stage, single-pass system with once-through hydrogen. The operating conditions during each run are summarized as follows: 1,000 p.s.i.g. total pressure, 1.0 LHSV, a hydrogen rate of 3,000 SCF/bbl, and temperature adjusted to determine the conversions obtainable at 710°, 735°, and 755° F. The conversions obtained for each catalyst are set forth in the following Table III, with it being noted that conversion was calculated as the volume percentage of material boiling above 700° F. converted to material boiling at or below 700° F.

TABLE III

| Catalyst | Volume Percent Conv. of 700° F.+ to Lower Boiling Products | | |
|---|---|---|---|
| | 710° F. | 735° F. | 755° F. |
| A | 17.5 | 20.6 | 25.1 |
| B | 17.5 | 22.5 | 29.9 |

The data in Table III clearly indicate that both catalysts are useful for mild hydrocracking a typical gas oil feedstock. In addition, the data obtained at 735° F. and 755° F. evince the superiority of Catalyst B containing the dispersion of silica-alumina in alumina over the otherwise identical Catalyst A containing alumina.

EXAMPLE II

A hydrocracking catalyst of the invention was prepared in the same manner as Catalyst B of Example I except that SAPO-11 was employed as the intermediate pore molecular sieve. This catalyst, designated Catalyst C, was tested under the mild hydrocracking conditions and with the feed described in Example I and the data obtained for activity, sulfur conversion, and nitrogen conversion against a commercial mild hydrocracking catalyst run under the same conditions and the same feed are set forth in the following Table IV:

TABLE IV

| | Conversion to 700° F.— at Temp. °F. | | | Wt. % Sulfur at Temp. °F. | | | Wt. % Nitrogen at Temp. °F. | | |
|---|---|---|---|---|---|---|---|---|---|
| | 710 | 735 | 755 | 710 | 735 | 755 | 710 | 735 | 755 |
| Commercial Catalyst | 18.0 | 22.6 | 29.6 | — | 0.23 | 0.113 | 0.040 | 0.024 | 0.015 |
| Catalyst C | 19.1 | 25.0 | 33.3 | 0.48 | 0.20 | 0.12 | 0.042 | 0.024 | 0.016 |

Based on the data in Table IV, the catalyst of the invention is markedly superior to the commercial catalyst for converting the feed to 700° F.— products and at least comparable in its activity for desulfurization and denitrogenation.

Although the invention has been described in conjunction with its preferred embodiment and examples, many variations, modifications, and alternatives will be apparent to those skilled in the art. For example, although the foregoing catalysts were described in relation to their particular usefulness for mild hydrocracking, it is clear from the discoveries in the present invention that such catalysts may also be used for hydrocracking, either alone or in conjunction with conventional wide pore hydrocracking catalysts. Also, although numerous intermediate pore molecular sieves have been disclosed for use in the invention, still others are contemplated, as, for example, organosilicate molecular sieves as disclosed in U.S. Pat. No. 4,104,294, herein incorporated by reference in its entirety, and the metallo-organosilicate molecular sieves disclosed in U.S. Pat. No. Re. 29,948, provided, of course, that the sieve chosen for use has a pore size between 5 and 7 angstroms. Accordingly, it is intended to embrace within the invention all such variations, modifications, and alternatives as fall within the spirit and scope of the appended claims.

I claim:

1. A process for mild hydrocracking a hydrocarbon feedstock comprising contacting said feedstock containing feed components boiling above 700° F. under conditions of elevated temperature and pressure less than about 1,500 p.s.i.g. with a particulate catalyst comprising at least one active hydrogenation metal component selected from the group consisting of Group VIB and Group VIII metals in combination with (1) a dispersion of silica-alumina in a matrix consisting essentially of alumina and (2) a crystalline intermediate pore molecular sieve comprising a silicoaluminophosphate having a pore size between about 5 and 7 angstroms, said conditions yielding about a 10 to about a 50 volume percent conversion of said feed components boiling above 700° F. to product components boiling at or below 700° F.

2. The process defined in claim 1 wherein said conditions include a hydrogen partial pressure less than about 1,200 p.s.i.g.

3. A process as defined in claim 1 wherein the hydrogen partial pressure is less than about 1475 p.s.i.g. and the conversion is between 15 and 30 volume percent.

4. A process as defined in claim 3 wherein the hydrogen partial pressure is less than about 1,450 p.s.i.g.

5. The process defined in claim 1 wherein said intermediate pore molecular sieve comprises SAO-11.

6. The process defined in claim 1 wherein the hydrogen partial pressure is less than about 1,000 p.s.i.g.

7. The process defined in claim 1 wherein said conversion is between about 15 and about 35 volume percent.

8. The process defined in claim 6 wherein said conversion is between about 15 and about 35 volume percent.

9. The process defined in claim 5 wherein said conversion is between about 15 and about 35 volume percent.

10. The process defined in claim 1 wherein said conversion is between about 15 and about 30 volume percent.

11. The process defined in claim 10 wherein said hydrogenation component comprises a combination of a Group VIB and Group VIII metals.

12. The process defined in claim 5 wherein said hydrogenation metal component comprises at least one metal selected from the group consisting of nickel and cobalt and at least one metal selected from the group consisting of molybdenum and tungsten.

13. The process defined in claim 6 wherein said hydrogenation metal component comprises at least one metal selected from the group consisting of nickel and cobalt and at least one metal selected from the group consisting of molybdenum and tungsten.

14. The process defined in claim 9 wherein said hydrogenation metal component comprises at least one metal selected from the group consisting of nickel and cobalt and at least one metal selected from the group consisting of molybdenum and tungsten.

15. A process for mild hydrocracking a hydrocarbon feedstock comprising feed components boiling above 700° F. comprising contacting said feedstock under conditions of elevated temperature and a hydrogen partial pressure less than about 1,500 p.s.i.g. with a particulate catalyst comprising at least one Group VIII active metal hydrogenation component and at least one Group VIB active metal hydrogenation component on a support comprising (1) a dispersion of silica-alumina in a matrix consisting essentially of gamma alumina and (2) a crystalline intermediate pore silicoaluminophosphate molecular sieve of about 5 to about 7 angstroms pore size, said conditions yielding between about a 10 and 50 volume percent conversion of the feed components boiling above 700° F. to product components boiling at or below 700° F.

16. The process defined in claim 15 wherein said hydrogen partial pressure is less than 1,200 p.s.i.g.

17. The process defined in claim 15 wherein said intermediate pore molecular sieve comprises SAPO-11.

18. The process defined in claim 17 wherein the hydrogen partial pressure is less than about 1,000 p.s.i.g.

19. The process defined in claim 18 wherein said conversion is between about 15 and about 35 volume percent.

20. The process defined in claim 18 wherein said conversion is between about 15 and about 30 volume percent.

21. A process for mild hydrocracking a hydrocarbon feedstock selected from the group consisting of a gas oil and residuum containing a substantial proportion of feed components boiling below about 1100° F. with a least some of said feed components boiling above 700° F., under conditions of elevated temperature and a hydrogen partial pressure between about 500 p.s.i.g. and about 1,500 p.s.i.g. with a catalyst comprising at least one Group VIII active metal hydrogenation component and at least one Group VIB active metal hydrogenation component on a support comprising in combination (1) a dispersion of silica-alumina in a matrix consisting essentially of gamma alumina and (2) a crystalline intermediate pore silicoaluminophosphate molecular sieve of about 5 to 7 angstroms pore size, said conditions being such that between about 10 and 50 percent by volume of said feed components boiling above 700° F. are converted to product components boiling at or less than 700° F.

22. A process as defined in claim 21 wherein between about 15 and 35 percent by volume of said feed components boiling above 700° F. are converted to product components boiling at or below 700° F.

23. A process as defined in claim 22 wherein said hydrogen partial pressure is less than about 1,200 p.s.i.g.

24. A process as defined in claim 21 wherein said intermediate pore molecular sieve has a pore size between about 5 and 6 angstroms.

25. A process for mild hydrocracking a hydrocarbon feedstock comprising said feedstock containing feed components boiling above 700° F. under conditions of elevated temperature and pressure less than about 1,500 p.s.i.g. with a particulate catalyst comprising at least one active hydrogenation metal component selected from the Group consisting of Group VIB and Group VIII metals in combination with (1) a dispersion of silica-alumina in a matrix consisting essentially of alumina and (2) an intermediate pore molecular sieve comprising a crystalline silica having a pore size between about 5 and 7 angstroms, said conditions yielding about a 10 to a 50 volume percent conversion of said feed components boiling above 700° F. to product components boiling at or below 700° F.

26. A process as defined in claim 25 wherein said catalyst comprises both Group VIII and Group VIB active hydrogenation components.

27. A process as defined in claim 26 wherein said pressure is above 500 p.s.i.g.

28. A process as defined in claim 27 wherein said catalyst comprises both nickel and tungsten hydrogenation components.

29. A process as defined in claim 28 wherein said intermediate pore molecular sieve is silicalite.

30. A process as defined in claim 29 wherein said conversion is between 15 and 35 volume percent.

31. A process as defined in claim 30 wherein the hydrogen partial pressure is less than about 1,000 p.s.i.g.

32. A process as defined in claim 29 wherein the hydrogen partial pressure is between 500 and 1,200 p.s.i.g.

* * * * *